UNITED STATES PATENT OFFICE.

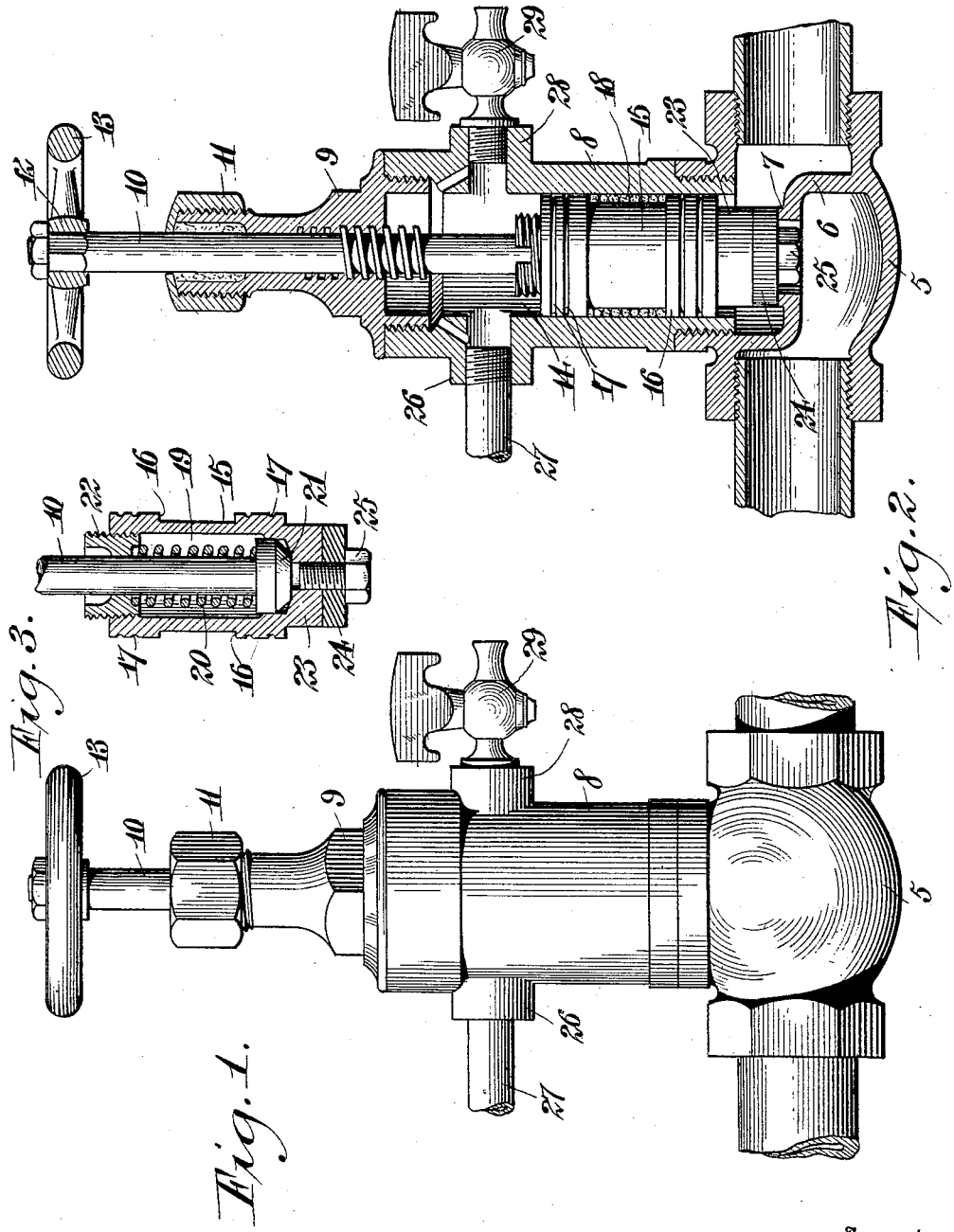

HARRY WALKER, JR., OF MODENA, PENNSYLVANIA.

FLUID-PRESSURE VALVE.

1,065,285.  Specification of Letters Patent.  Patented June 17, 1913.

Application filed September 27, 1912. Serial No. 722,772.

*To all whom it may concern:*

Be it known that I, HARRY WALKER, Jr., a citizen of the United States, residing at Modena, in the county of Chester and State of Pennsylvania, have invented new and useful Improvements in Fluid-Pressure Valves, of which the following is a specification.

The invention relates to valves, and more particularly to the class of automatic fluid pressure valves.

The primary object of the invention is the provision of a valve wherein the excessive pressure within a fluid main or conduit will effect the automatic closing of the valve or regulate the flow of fluid in the main or conduit, thus avoiding the necessity of manually manipulating the valve.

Another object of the invention is the provision of a valve wherein fluid pressure will automatically operate the same, yet the said valve may be manually operated for regulating the supply of fluid in a main, pipe, or other conduit.

A further object of the invention is the provision of a valve of this character wherein a standard or ordinary globe valve casing is employed and has mounted thereon a plunger chamber within which is arranged a plunger, which controls the movement of the valve within the casing, so that fluid supply can be automatically cut off on the pressure of fluid therein exceeding predetermined pounds pressure.

A still further object of the invention is the provision of a valve of this character which is simple in construction, reliable and efficient in operation, strong, durable, and inexpensive in manufacture.

With these and other objects in view the invention consists in the construction, combination and arrangement of parts as will be hereinafter more fully described, illustrated in the accompanying drawings, and pointed out in the claims hereunto appended.

In the drawings: Figure 1 is a side elevation of a valve constructed in accordance with the invention. Fig. 2 is a vertical longitudinal sectional view thereof. Fig. 3 is a fragmentary side elevation of the plunger or piston, the same being partly in section.

Similar reference characters indicate corresponding parts throughout the several views in the drawings.

Referring to the drawings by numerals, the valve comprises a standard of the ordinary globe valve casing or shell 5, formed with the usual partition 6, having a valve seat 7, the casing or shell 5 being coupled to a fluid main in any ordinary well-known manner, which is adapted for connection with the steam cylinder of a pump whereby the fluid in the said main will pass through the casing or shell in to said pump cylinder.

Detachably connected to the top of the valve shell or casing 5 is a plunger cylinder 8, the inner end of which communicates with the said shell or casing, while its outer end has detachably engaged therewith the usual standard globe valve bonnet 9, in which is adjustably threaded a turning valve stem 10, the bonnet being provided with the usual packing nut 11, at its outer end, and through which works the valve stem 10 which at its outer end is formed with a reduced portion 12, on which is fitted a hand wheel 13 as usual whereby the said stem 10 can be manually manipulated in the ordinary well-known manner.

Arranged within the plunger chamber 14 formed by the plunger cylinder is a valve plunger 15, which is designed for sliding movement within the said cylinder 8, and is formed with annular external flanges 16, provided with fluid grooves 17, the flanges 16 being spaced apart and are designed to frictionally engage the inner wall of the cylinder 8 and have arranged therebetween a packing 18, so as to prevent leakage between the said plunger and the cylinder during the working of the plunger within the latter. Formed centrally in the plunger 15 and opening through the outer end thereof is a socket or recess 19 into which projects the inner end of the stem 10 which is surrounded by a coiled compression spring 20 one end of which works against a nut 21 detachably mounted on the said stem 10, while the opposite end of the spring works against a plunger nut 22 loosely surrounding the stem 10 and adjustably threaded in the socket 19 in the plunger 15 so that on admission of pressure to the plunger chamber 14 the said plunger 15 will be forced in the direction of the valve seat 7 against the resistance of the compression spring 20, it being understood of course that the pressure of the fluid admitted to the chamber 14 is sufficient to overcome the resistance of the compression spring 20 in the plunger, thereby automatically seating the valve hereinafter described.

Formed at the inner end of the plunger 15 is a reduced circular-shaped valve bed 23 against which rests a resilient valve 24, the latter being of a size and shape corresponding to the bed 23 and is fastened thereto by means of a lock bolt 25, the valve being designed to engage the seats 7 in the casing or shell 5 on the movement of the plunger 15 in one direction and by the action of fluid pressure within the plunger chamber 14, so that the said valve 24 when engaging the seat 7 will shut off the fluid supply through the valve shell or casing 5 as will be clearly apparent.

It will be obvious on adjusting the valve stem 10 the compression spring 20 may be regulated to vary the resistance thereof for overcoming predetermined pounds pressure of fluid entering the plunger chamber 14, the fluid being admitted to the latter in a manner presently described.

Tapped in an inlet nipple 26 formed on the plunger cylinder 8 is a pipe 27 which is also adapted for connection with the water end of a pump so that water pressure will be admitted from the said water end of the pump into the plunger chamber 14, and thereby automatically control the action of the valve. Formed on the plunger cylinder 8 diametrically opposite the inlet nipple is an outlet nipple 28 which permits the exhaust or release of the fluid pressure within the plunger chamber 14 and this nipple has tapped therein a valve 29 of the ordinary well-known type.

It is of course understood that the valve stem 10 is turned so as to open the valve 24 and on the pressure of fluid exceeding a predetermined pounds pressure the plunger 14 will be acted upon by the fluid pressure for automatically closing the valve and thereby shutting off the fluid supply through the valve shell or casing 5 until the said pressure has been reduced to predetermined pressure, whereupon the said valve will automatically open.

It is deemed needless to further describe the construction of the valve in detail and its manner of operation, because it is thought from the foregoing that the construction and mode of operation of the device will be clearly understood. Thus a more extended explanation has been omitted. However, it is understood that the invention is not limited to the details of construction as disclosed in the accompanying drawings and set forth in the preceding description, as changes, variations, and modifications may be made in the invention such as come properly within the scope of the claims hereunto appended without departing from the spirit of or sacrificing any of the advantages of the invention.

What is claimed is:—

1. A valve of the class described comprising a casing having a valve seat interiorly thereof, a plunger cylinder mounted upon the valve casing, a plunger working within said cylinder and having a chamber opening through one end thereof, a valve stem adjustably mounted in the plunger cylinder and having a headed end projected into the chamber in the plunger, compression means arranged within the chamber in the plunger and acting upon the head on the valve stem, means adjustably engaged in the chamber in the plunger and acting upon the compression means to regulate the same, a valve carried by the plunger and adapted to engage the valve seat, and means for admitting fluid to the cylinder for acting upon the plunger against the resistance of the compression means whereby the valve will be automatically engaged with the seat.

2. A valve of the class described comprising a casing having a valve seat interiorly thereof, a plunger cylinder mounted upon the valve casing, a plunger working within said cylinder and having a chamber opening through one end thereof, a valve stem adjustably mounted in the plunger cylinder and having a headed end projected into the chamber in the plunger, compression means arranged within the chamber in the plunger and acting upon the head on the valve stem, means adjustably engaged in the chamber in the plunger and acting upon the compression means to regulate the same, a valve carried by the plunger and adapted to engage the valve seat, means for admitting fluid to the cylinder for acting upon the plunger against the resistance of the compression means whereby the valve will be automatically engaged with the seat, and means for admitting fluid pressure within the cylinder.

3. A valve of the class described comprising a casing having a valve seat interiorly thereof, a plunger cylinder mounted upon the valve casing, a plunger working within said cylinder and having a chamber opening through one end thereof, a valve stem adjustably mounted in the plunger cylinder and having a headed end projected into the chamber in the plunger, compression means arranged within the chamber in the plunger and acting upon the head on the valve stem, means adjustably engaged in the chamber in the plunger and acting upon the compression means to regulate the same, a valve carried by the plunger and adapted to engage the valve seat, means for admitting fluid to the cylinder for acting upon the plunger against the resistance of the compression means whereby the valve will be automatically engaged with the seat, means for admitting fluid pressure within the cylinder, a detachable bonnet mounted upon the said cylinder and surrounding the valve stem and having screw threads therein, and screw threads formed on the valve stem and engaging the screw threads in the bonnet whereby on turning the valve stem the said plunger can be moved toward or away from the valve seat.

In testimony whereof I affix my signature in presence of two witnesses.

HARRY WALKER, Junior.

Witnesses:
WILLIAM S. G. COOK,
HARRY WALKER, Sr.